MECHANISM FOR POSITIONING A SPHEROIDAL TYPE HEAD TO PRESENT A SELECTED TYPE TO A PRINT POSITION

Filed Oct. 19, 1967 7 Sheets-Sheet 1

INVENTOR.
RICHARD J. JABLONSKI.
BY
Wallace P. Lamb
ATTORNEY.

INVENTOR.
RICHARD J. JABLONSKI.
BY
Wallace P. Lamb
ATTORNEY.

MECHANISM FOR POSITIONING A SPHEROIDAL TYPE HEAD TO PRESENT A SELECTED TYPE TO A PRINT POSITION

Filed Oct. 19, 1967 7 Sheets-Sheet 3

INVENTOR.
RICHARD J. JABLONSKI.
BY
Wallace P. Lamb
ATTORNEY.

INVENTOR.
RICHARD J. JABLONSKI.
BY
Wallace P. Lamb
ATTORNEY.

MECHANISM FOR POSITIONING A SPHEROIDAL TYPE HEAD TO PRESENT A SELECTED TYPE TO A PRINT POSITION

Filed Oct. 19, 1967

INVENTOR.
RICHARD J. JABLONSKI.
BY
Wallace P. Lamb
ATTORNEY.

| 1 | 2 | 3 | 4 | 5 | 6 | 7 | 8 | 9 | 10 | 11 |
|---|---|---|---|---|---|---|---|---|---|---|
| 0 | 9 | 4 | 5 | 1 | 2 | 3 | 8 | 6 | 7 | @ |
|  | I | D | E | A | B | C | H | F | G | — |
| / | R | M | N | J | K | L | Q | O | P | ; |
| , | Z | U | V | ' | S | T | Y | W | X | . |

|  | 1 | 2 | 3 | 4 | 5 | 6 | 7 | 8 | 9 | 10 | 11 |
|---|---|---|---|---|---|---|---|---|---|---|---|
| S 1 |  |  |  |  |  | X | X | X | X | X | X |
| S 2 |  |  | X | X | X |  |  |  | X | X | X |
| S 3 |  | X |  | X | X |  | X | X |  | X | X |
| S 4 |  | X |  |  | X |  |  | X |  |  | X |

INVENTOR.
RICHARD J. JABLONSKI.
BY
Wallace P. Lamb
ATTORNEY

INVENTOR.
RICHARD J. JABLONSKI
BY

ATTORNEY.

United States Patent Office 3,467,233

Patented Sept. 16, 1969

3,467,233

MECHANISM FOR POSITIONING A SPHEROIDAL TYPE HEAD TO PRESENT A SELECTED TYPE TO A PRINT POSITION

Richard J. Jablonski, Farmington, Mich., assignor to Burroughs Corporation, Detroit, Mich., a corporation of Michigan Filed Oct. 19, 1967, Ser. No. 676,493
Int. Cl. B41j 23/02, 23/04, 1/32
U.S. Cl. 197—16 5 Claims

ABSTRACT OF THE DISCLOSURE

The disclosure embodies a single spheroidal type carrier or head for striking a platen and includes mechanism for positioning the head to present a selected one of different printing types to a print line. Selection of a printing type is made by activating one or more of a plurality of positionable stop members, such as solenoid cores, representative permutatively of different printing type for printing alphanumeric characters and other required symbols. A single carrier or code plate for a plurality of relatively offset abutments is movable to engage and abut the selected stop members and is operatively connected to the type head to position the latter accordingly. A cyclically operable control member or cam controls movement of the code plate into engagement with the selected stop member or members, the print head being thereafter operated to effect a printing operation.

SUMMARY OF THE INVENTION

The invention resides in the provision for a typewriter of an improved mechanism for operatively connecting a cyclically operable control member or cam to a positionable spheroidal type carrying head. The improved mechanism includes a coded member or plate mounted for movement linearly or rotatively or a combination of such actions by the cyclically operated cam, depending upon the positions of a number of presettable stop members which are settable in positions respectively representative of different positions of the print head.

In the prior art it has been proposed to selectively position a print head by using the movable cores of solenoids as actuators, connected by belt and pulley systems to the type head. In such systems, it is necessary to establish a precise travel of each of the solenoid cores and further requires an undesirable number of pulley systems even though the number of solenoids is reduced by the use of a permutative system or code.

Accordingly, it is an object of the invention to provide an improved mechanism for stopping the print head in any one of a number of selectable positions in which a cyclically operable control member or cam of a typewriter is employed to effect movement of the type carrier under control of a permutative system of selectable stop abutments.

Specifically, it is an object of the invention to provide a mechanism in which all of the stop abutments, respectively permutatively representative of the type characters, are on a single movable member or code plate for engaging selected ones of presettable stop members.

Figures 12, 17, 18:
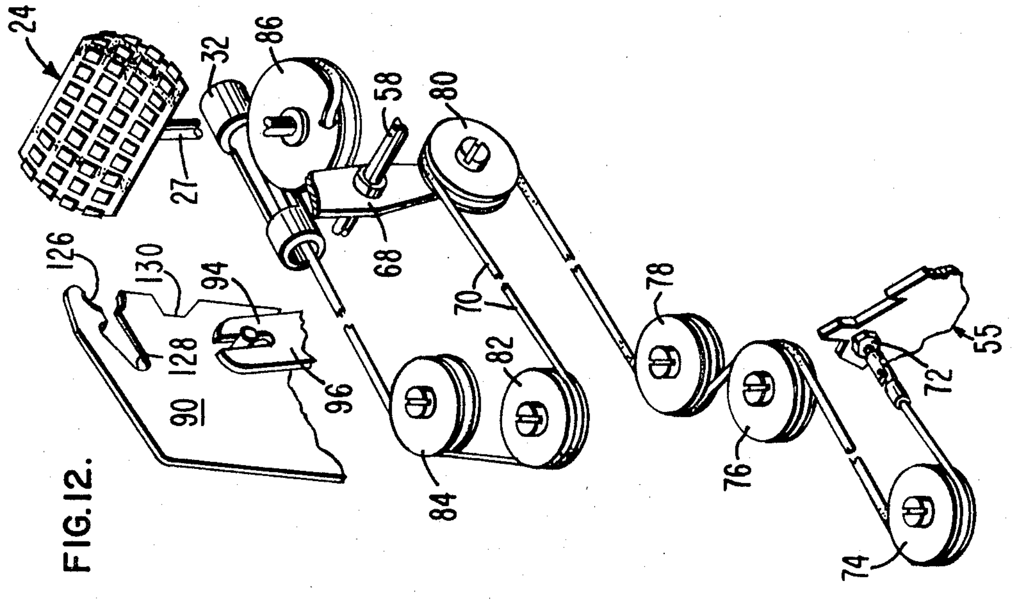
FIG. 12 is a fragmentary perspective view of certain parts of the mechanism shown removed therefrom.
Figure 13:
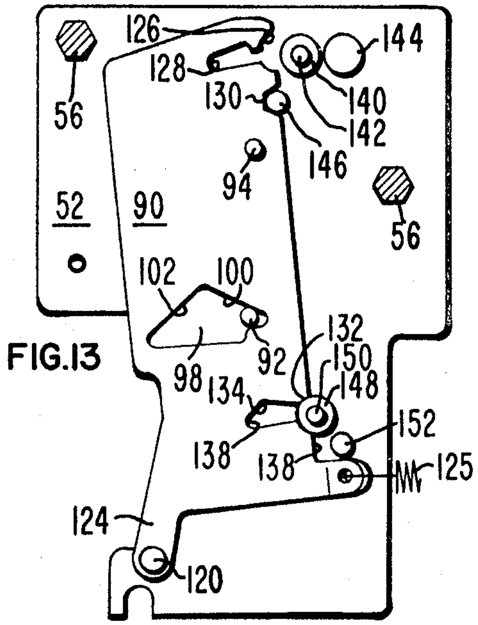
Figure 14:
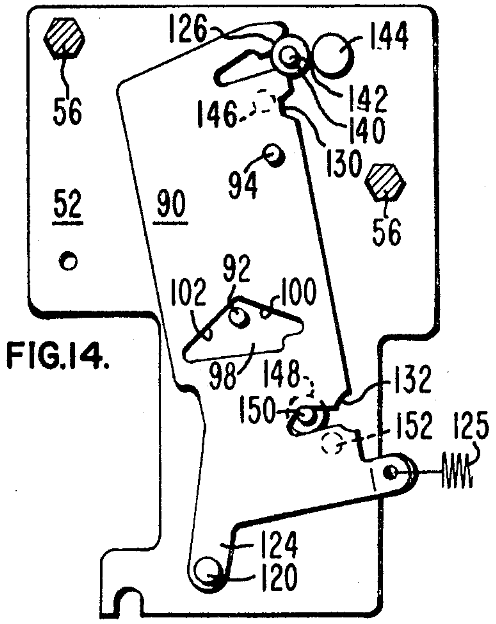
Figure 15:
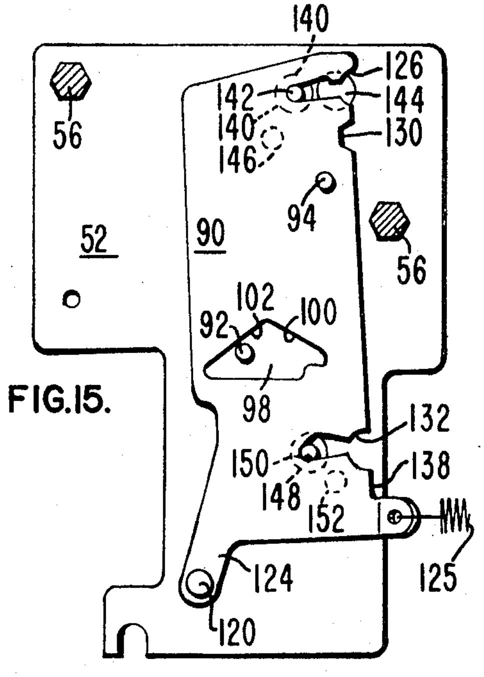
Figure 16:
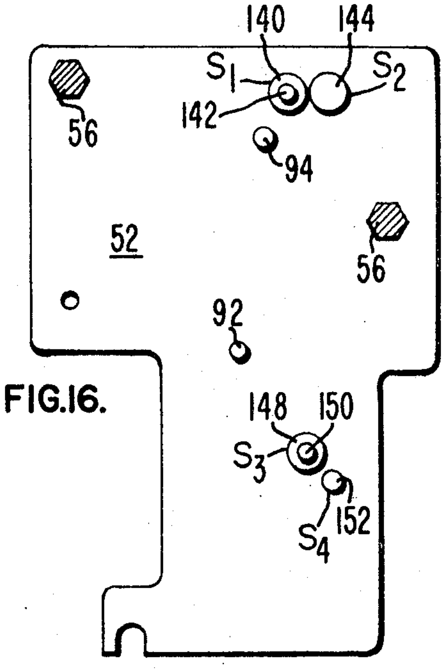

FIGS. 13, 14, and 15 are similar elevational views of certain operating parts of the mechanism shown removed therefrom to illustrate some of the various positions said parts will assume in operation of the mechanism;

FIG. 16 is an elevational detail view;

FIG. 17 is an illustration of one arrangement of alphanumeric characters for the printer; and FIG. 18 is a chart illustrating the positions to which a print head may be rotated to present any one of a number of the alphanumeric characters to a print position and a permutative code that may be used.

Figure 1:
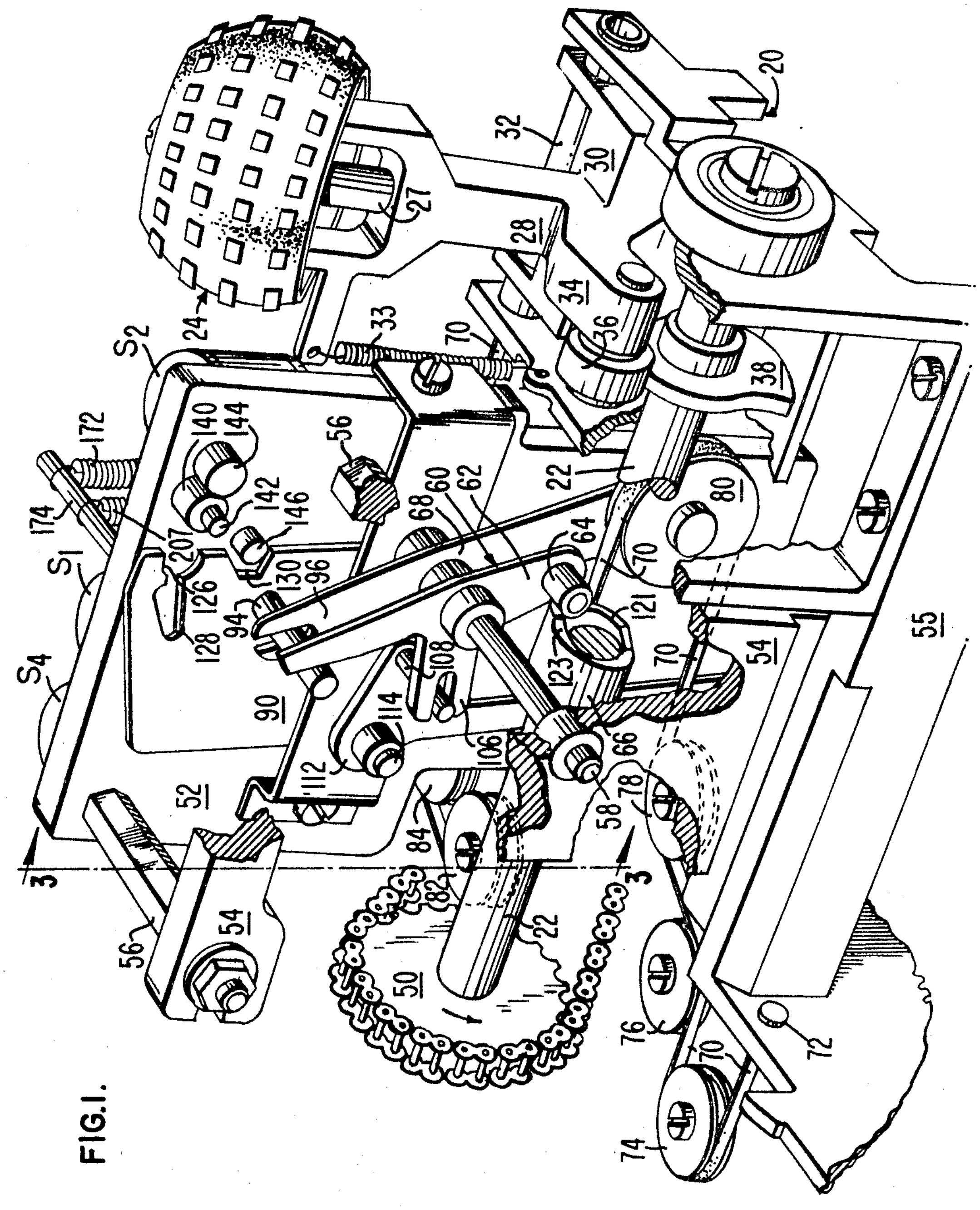
FIG. 1 is a fragmentary perspective view of a typewriter embodying features of the invention.
Figure 3:
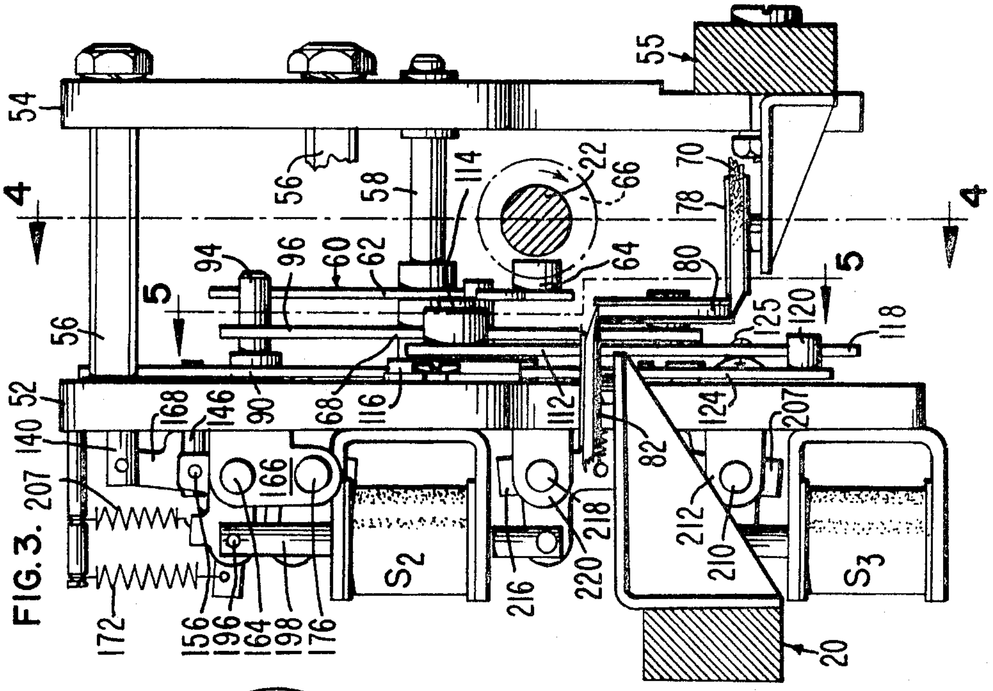
FIG. 3 is a side view partly in section, taken in the direction of the arrows 3—3 of FIG. 1.

With reference to FIG. 1, a printer or typewriter includes a supporting means or frame 20, a cylically operable means or shaft 22, and a single type carrier or head 24. The shaft 22 is journaled in the frame 20 for rotation about a horizontal axis and is operatively connected to the head 24 by known interconnecting mechanism, to swing the head against an impression means or platen 26.

Figure 2:
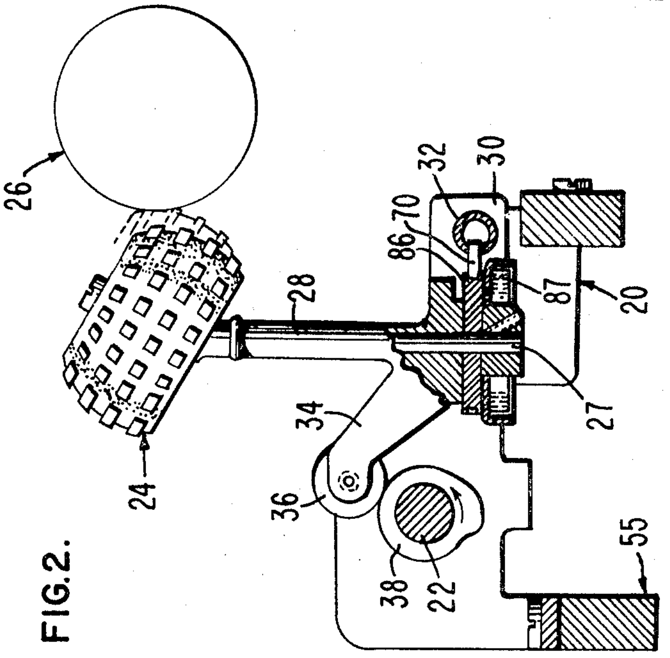
FIG. 2 is a fragmentary side view partly in section.

As shown in FIG. 2, the printing head 24 is mounted on the upper end of a rotatable shaft 27 which is journaled in a hollow arm 28 having a base 30 which is pivotal on a horizontal tubular shaft 32, the shaft 32 being stationary and rigidly mounted on the frame 20. The base 30 of the arm 28 has an integral arm 34 which extends forwardly and upwardly and carries a follower 36 which rides on a cam 38, affixed onto the cyclically operable shaft 22. Thus, the cam 38, acting against the follower 36, will thrust the type head 24 against the platen 26 about the axis of shaft 32 and thereafter the head will be retracted, such as by means of a spring 33.

The printing head 24 is preferably spheroidal in contour and affixed to the periphery thereof are printing type for the printing of alphanumeric characters and other desired symbols and signs. Any suitable arrangement of the type may be used, such as the arrangement suggested by FIG. 17, wherein four rows of type are arranged on one portion of the spheroidal head 24 with each row containing eleven characters. In this group of type, the numeric characters are upper case letters, as shown. On a portion of the spheroidal head 24, opposite the aforementioned group of type, a second group of four rows of type is provided for printing lower case characters. As is well known in the art, mechanism (not shown) is employed to rotate a spheroidal print head to select and move one of the above-mentioned groups of type to the position adjacent the platen 26. Also well known in the art is mechanism (not shown) for tilting the head 24 to position a selected one of the rows of type to the print line of the platen. In the interest of simplicity of this disclosure, the description is limited to the rotation of the print head 24 to position any selected one of the upper row of characters of FIG. 17 to print position since the herein disclosed invention is equally applicable to row selection by a tilting operation. For a more detailed understanding of lower and upper case character selection and character row selection, reference may be had to the patent to John E. Hickerson, No. 2,905,302, issued Sept. 22, 1959; the patent to Frank E. Becker et al., No. 2,926,768, issued Mar. 1, 1960, or the patent to Ronald D. Dodge et al., No. 3,050,-170, issued Aug. 21, 1962.

Affixed onto the shaft 22 there is a sprocket 50 which is driven from a drive shaft (not shown) to rotate the shaft 22 one revolution in response to a signal. This cyclically operable mechanism is not shown because it is well known in the art; and it should suffice to state that the signal for activating a one revolution of the shaft 22 in printers, in general, could be had by any suitable read-in device receiving information from an extraneous source, or in the case of a typewriter could be initiated by depression of a typewriter key. In either case, the drive shaft could be connected to a source of power, such as an electric motor, by means of any well known one revolution clutch actuatable by a solenoid under control of a key operated switch, as shown, for example, in assignee's co-pending application entitled "Electric Typewriter Keyboard Operated Mechanism," Ser. No. 635,715, filed May 3, 1967.

In accordance with the invention, I provide a mechanism for positioning or rotating the print head 24 with respect to a print position with the platen 26, the mechanism being mounted on a pair of oppositely spaced-apart upright members, or plates 52 and 54. As shown in FIG. 1, the plates 52 and 54 are positioned between the sprocket 50 and the print head 54, with the plates in relative broadside relation and the shaft extending horizontally therebetween. The plates 52 and 54 are rigidly mounted on the machine frame 55 and are rigidly connected together by cross rods 56.

A horizontal cross shaft 58 has its opposite ends secured in and to the plates 52 and 54, and pivotally mounted on the shaft there is an operator or lever 60. A downwardly directed arm 62 of the lever 60 carries a cam follower 64 which engages a control means or cam 66 on the cyclically operable camshaft 22 to pivot the lever 60 first in a counterclockwise direction and then in a clockwise direction, as viewed in FIG. 1. Another lever 68, pivoted on the shaft 58, is positioned between the lever 60 and the supporting plate 52 and is operatively connected to the print head 24 by a belt or metal tape 70 in a manner such that a pivoting of the lever 68 will cause the head 24 to rotate. As shown in FIG. 12, one end of the tape 70 is anchored to the frame, as at 72, of the machine and extends around several pulleys 74, 76, 78, 80, 82, and 84 and into the sleeve bearing 32 which has an opening in the side thereof so that the tape 70 can extend around and be connected to a pulley 86 which is affixed to the lower end of the rotatable shaft 27 of head 24.

Further in accordance with the invention, a differentially positionable member 90, in the form of a code plate is provided and is operatively connected to the print head 24 by means of the lever 68 and the tape 70. As is shown, for example in FIG. 4, the plate 90 is connected to the lever 68 by means of a stud 94 which is secured to the plate and engages in the bifurcated upper end of the lever. A lower stud 92, affixed to the side member 52, projects through an opening 98 provided in the plate and an upper edge of the opening rests on the stud 92 in the position of the plate shown in FIG. 4 to support the plate only in this one position. A torsion spring 87 surrounds the shaft 27, as shown in FIG. 2, the spring having one end connected to the shaft and the other end anchored. The spring 87 functions to keep the tape 70 taut, rotate the head 24, and pivot the code plate 90 under control of the cam 66.

Figure 4:
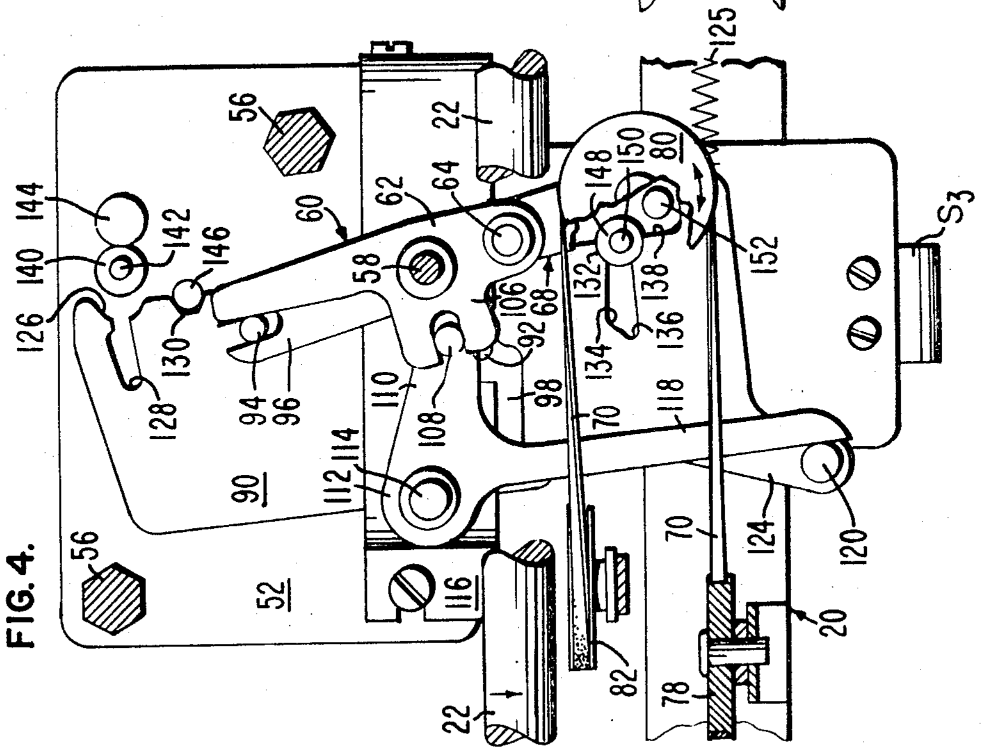
FIG. 4 is a vertical sectional view partly in elevation, taken along the line 4—4 of FIG. 3.

Adjacent its upper end, the lever 60 abuts the pin 94, the arrangement being such that counterclockwise rotation of the lever 60 will move the plate in a leftward direction, as viewed in FIG. 4. A relatively short arm 106 of the lever 60 has a bifurcated end which receives a stud 108, carried by an arm 110 of a second lever 112. The lever 112 is pivotally mounted on a stub shaft 114 which is affixed to a bracket 116 which in turn is mounted on the side member 52. A depending arm 118 of the lever 112 engages a stud 120 on a downwardly directed extension 124 of the plate 90, at the lower end of the latter. It will now be seen that when the lever 60 is rotated counterclockwise, the code plate 90 is moved to the left, as viewed in FIG. 4, by the application of lever transmitted forces at both the upper and lower studs 94 and 120 respectively. Also in FIG. 4, it will be seen that when the lever 68 is rotated clockwise by the torsion spring 87, the code plate 90 will be moved rightward, aided by a spring 125. The control means or cam 66 has a home position to which it returns at the end of operation, and in this position the cam restrains the torsion spring 87 and the spring 125. As a consequence, the code plate 90 and the levers 60 and 88 and associated operating parts are held by the cam 66 in the positions shown, for example, in FIG. 4 until the next cycle of operation. To accomplish this, the cam 66, as illustrated in FIG. 1, may be designed having a riser surface 121 and a declining surface 123 connecting high and low points about 180° apart. The arrangement is such that the follower 64 comes to rest at the end of a cycle, on the riser 121, slightly above the low point of the cam. Upon initiation of a cycle of operation of the cam 66, the code plate 90 is moved thereby in a leftward direction, as viewed in FIG. 4, by the follower 64 as the latter rides up the riser 121, and after reaching the high point of the cam, the follower rides down the incline which allows the code plate 90 to be moved rightwardly by the springs 87 and 125. In FIG. 1, the cam follower 64 has passed the high point of the cam 66 and the code plate 90 is being moved rightwardly.

Figure 5:
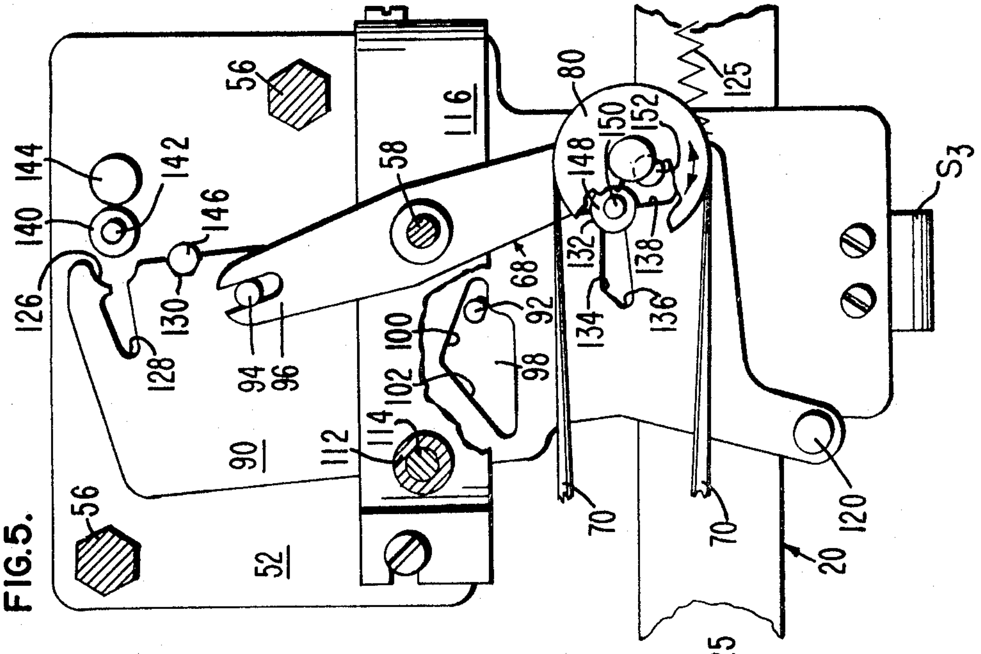
FIG. 5 is a vertical sectional view, taken along the line 5—5 of FIG. 3 showing the operating parts in positions they may assume.
Figures 6, 7, 9, 10, 11:
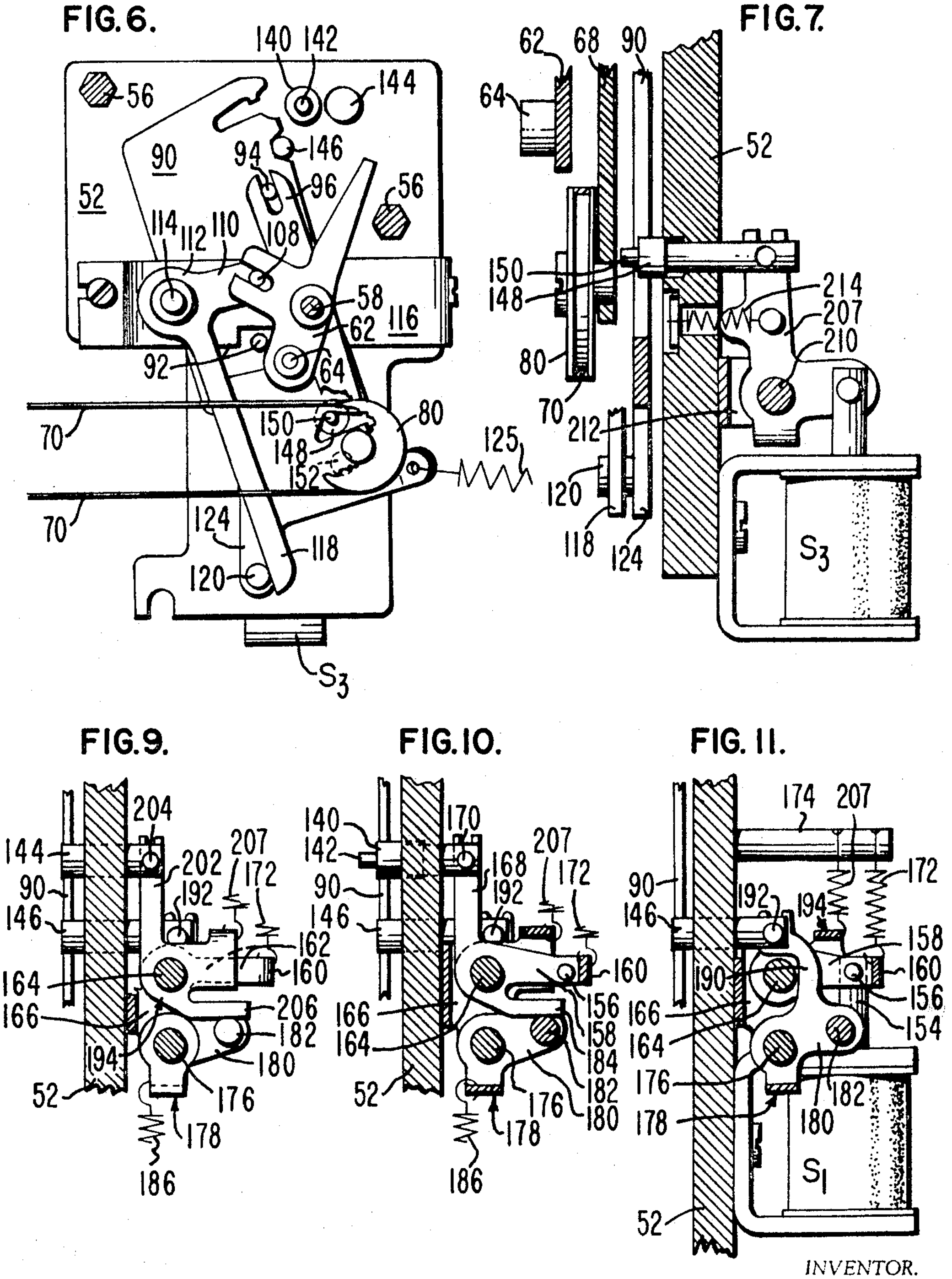
FIG. 6 is a view similar to FIG. 5 showing the operating parts in another position they may assume.
FIG. 7 is a vertical sectional view, taken substantially along the line 7—7 of FIG. 8.
FIG. 9 is a vertical sectional view, partly in elevation, taken along one line 9—9 of FIG. 8.
FIG. 10 is a vertical sectional view, partly in elevation, taken along the line 10—10 of FIG. 8.
FIG. 11 is another vertical sectional view, partly in elevation, taken along the line 11—11 of FIG. 8.

In the rightward edge of the code plate 90 there is provided a number of relatively offset abutments 126, 128, 130, 132, 134, 136, and 138. As shown, the abutments are of relatively different depths with respect to the edge of the plate and are cooperable with one or more of a number of selectively settable stop members 140, 142, 144, 146, 148, 150, and 152. The stop members are slidably mounted and guided in apertures in the side plate 52, as shown in FIGS. 7 and 9, and are retractable by four solenoids $S_1$, $S_2$, $S_3$, and $S_4$. The stop members are arranged along the rightward edge of the code plate 90, as seen in FIG. 4, and are positioned to be engaged by selected ones of the abutments, depending upon the character to be printed. The stop members are preferably in the form of pins having shanks which extend beyond the side plate 52 for connection with certain ones of the solenoids $S_1$, $S_2$, $S_3$, and $S_4$ in a permutative system or code. The stop members 140 and 142 are coaxial and integral, the stop member 142 being of reduced diameter for engagement by the relatively deeper abutment 128 in the code plate 90. Normally, the larger diameter stop member 140 is in the path of code plate 90 and is retractable to place the smaller diameter stop member 142 in the path of the code plate 90. Similarly, the stop members 148 and 150 are integral and coaxial, the stop member 148 being of larger diameter for engagement by the code plate abutment 132 and the stop member 150 being of smaller diameter for engagment by either the abutment 134 or the abutment 136, depending upon the permutative selection of the stop members. As shown in FIG. 4, the code plate 90 is shown in a posiiton with its abutments 130 and 132 respectively engaging the stop members 146 and 148. This position of the code plate 90 occurs in the present system when none of the solenoids $S_1$, $S_2$, $S_3$, and $S_4$ is energized and is the first or "0" position as indicated in FIGS. 4 and 5. The zero position of the code plate 90 is also shown in FIG. 13. In FIG. 14, the code plate 90 is shown in position No. 5, the position the plate will assume following the energization of solenoids $S_2$, $S_3$, and $S_4$. In FIG. 15, the code plate 90 is shown in the position it will assume when all of the solenoids $S_1$, $S_2$, $S_3$, and $S_4$ are energized. Other positions, which the code plate 90 may assume, will be apparent from a consideration of the code chart of FIG. 18.

With reference particularly to FIGS. 8 to 11, the solenoid $S_1$ has an extension 154 of its movable core pivotally connected, as at 156, to one arm 158 of a bail 160 which has another arm 162 laterally of and parallel to arm 158. The arm 162 of the bail 160 is affixed onto a rotatable horizontal shaft 164, mounted on the supporting plate 52 by means of a suitable bracket 166. As shown in FIG. 10, another arm 168 of the bail 160 is pivotally connected, as at 170, to the shank of the stop pins 140, 142 such that energization of the solenoid $S_1$ will retract the stop members 140, 142, to place the smaller diameter stop member 142 in the path of movement of the code plate 90. A helical coil spring 172 is connected to the bail 160 and to an anchoring pin 174, as shown in FIG. 1 to return the stop pins to their normal positions when the solenoid $S_1$ is de-energized.

Figure 8:
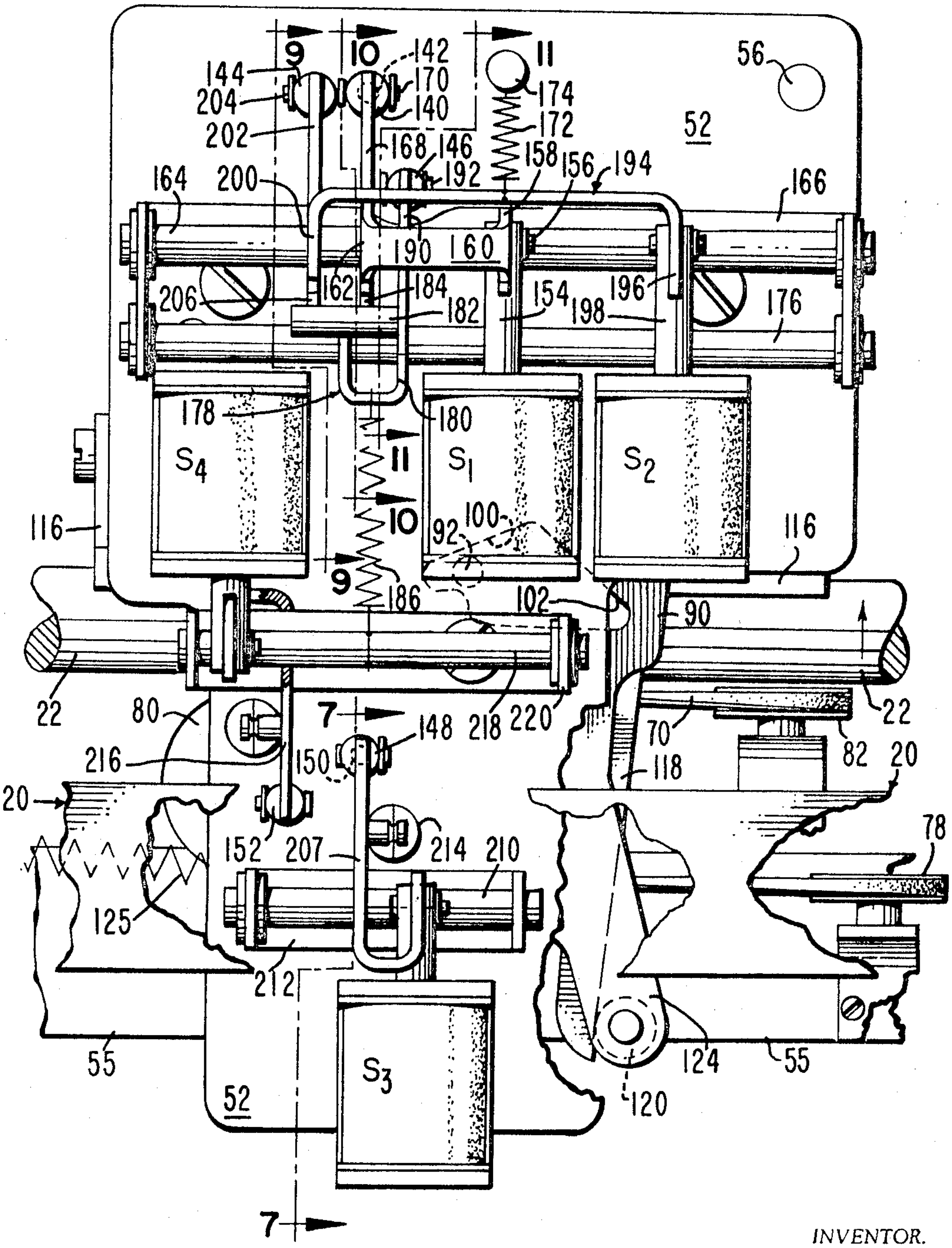
FIG. 8 is a fragmentary elevational view looking from left to right of FIG. 3.

Spaced below and parallel with the shaft 164 there is a similar shaft 176 on which a bail type lever 178 is pivotably mounted, as shown in FIGS. 8 and 11. The lever 178 has an arm 180 which carries a stud 182 that is held against an arm 184 of lever 162 by a coil spring 186, as shown in FIG. 10. Also, the bail arm 180 has an upwardly extending arm 190, bifurcated at its upper end to receive a connecting pin 192 to connect the arm 190 to the shank of the stop pin 146. From the above description, with reference to FIGS. 8 to 11, it will be understood that when solenoid $S_1$ is energized, the pin 140 and the pin 146 are both retracted. For example, when lever 162 is pivoted clockwise, as viewed in FIG. 10, to retract the pin 140, the arm 184, engaging the pin 182, pivots the lever 178 clockwise to retract the stop pin 146.

A bail type lever 194 is pivotally mounted on the shaft 164 and has one arm 196, as seen in FIG. 8, pivotally connected to an extension 198 of the movable core of solenoid $S_2$. The other arm, as at 200, of the bail 194 has an upwardly directed extension 202 which is pivotally connected to the stop pin 144 by a pivot pin 204. As shown in FIG. 9, a lower arm 206 of the bail 194 is engaged by the pin 182 so that when the solenoid $S_2$ is energized, both of the stop pins 144 and 146 are retracted out of the path of the code plate 90. For example, when solenoid $S_2$ is energized, the bail 194 is pivoted thereby in a clockwise direction, facing FIG. 9, to retract the stop pin 144 and concurrently therewith the arm 206, acting against the pin 182, rotates lever 178 clockwise to retract the stop pin 146. A coil spring 207 functions to return the stop pins 144 and 146 to their normal positions upon de-energization of solenoid $S_2$.

The solenoid $S_3$ is located on the supporting plate 52 adjacent the lower edge thereof and is connected by a bail type lever 208 to the common shank of the stop pins 148, 150. A shaft 210 is mounted on the plate 52 by a suitable bracket 212 and the lever is pivotably mounted on the shaft. A spring 214 is provided to return the pins 148, 150 to their normal positions with the larger diameter pin 148 in the path of the code plate 90. Similarly, the solenoid $S_4$ has its movable core connected by a lever 216 to the shank of the stop pin 152 and is pivotably mounted on a horizontal shaft 218, supported on the plate 52 by a suitable bracket 220.

OPERATION

In operation, the character to be moved to printing position is selected by activating one or more of the solenoids $S_1$, $S_2$, $S_3$, and $S_4$, according to the permutative system or code and arrangement of the type characters on the print head 24. As previously mentioned, the solenoids $S_1$, $S_2$, $S_3$, and $S_4$ may be selected by well known keyboard switches, and the shaft 22 and therefore the control cam 66, may be cycled one revolution on release of a one revolution clutch by a motor bar. As an example, assume that it is desired to print the numeral "1" which is the number 5 position as shown in the charts of FIGS. 17 and 18. This requires that the solenoids $S_2$, $S_3$, and $S_4$ be energized. When this occurs, the stop pins 144, 146, 148, and 152 will be retracted by the solenoids $S_2$, $S_3$, and $S_4$, as illustrated in FIG. 14 to limit movement of the code plate 90 to the position shown. Upon a cycling operation of the shaft 22 of FIG. 1, the cam 66 pivots the cam follower lever 62 first in a counterclockwise direction. Counterclockwise rotation of the lever 60, engaging the pin 94, will move the code plate 90 leftward, as viewed in FIG. 4, the purpose being to move the code plate away sufficiently to clear all of the electrically operated stop pins 140 to 152. As the lever 60 rotates clockwise, the torsion spring 87, shown in FIG. 2, acting through the pulley guided tape 70 pivots the lever 68, shown in FIG. 4 in a clockwise direction. The clockwise rotation of the lever 68 engaging the pin 94 moves the code plate 90 in a rightward direction, as viewed in FIG. 4, aided by the spring 125. The code plate 90 moves until its abutments engage the selected ones of the stop members whereupon the code plate 90 assumes the position shown in FIG. 14. The distance between the consecutive positions 1 to 11 of the code plate 90 correspond to the distances between adjacent ones of the print head characters so that any selected code designates the character to be printed.

In resume, it will be appreciated that the present invention provides a mechanism in which a single movable code plate is operable to rotatively position a print head in any one of a number of positions to present a selected printing type to print position. This is accomplished by providing a floatably mounted code plate 90 to limit aganist selected ones of an upper group of retractable stop members and a lower group of retractable stop members. In order to floatably mount the code plate, the larger diameter stop members also function as fulcrums for the code plate and the smaller diameter stop members also function as supports and guides for the code plate. Thus, the code plate 90 is movable linearly, or is pivotal about one of the larger diameter stop members or has a compound lineal and pivotal motion depending upon the position selected.

What is claimed is:

1. In printing apparatus, a mechanism for positioning a differentially positionable printing head having a number of printing type thereon comprising supporting means, a plate movably mounted on said supporting means for edgewise movement first in one direction and then in an opposite direction, said plate to be operatively connected to the printing head and having an abutting edge, a plurality of movable stop members arranged in relatively offset relation along the path of movement of said plate for engagement by the abutting edge of said plate, said stop members selectively settable to limit movement of said plate in said opposite direction to any one of a number of positions, means urging said plate in said opposite direction, and a control member normally restraining said means and operable to effect movement of said plate in said first direction and then effect movement of said plate in said opposite direction by said means, at least one of said stop member consisting of two axial sections of different diameter pins; said abutting edge of said plate having a plurality of recessed abutments, at least one of said recessed abutments including a shallow portion and a deep portion, said shallow and deep portions being of different widths to cooperate with the different diameter sections of said at least one of said pins.

2. In a printing apparatus, as defined by claim 1 wherein said plate is floatably mounted in an upright attitude having its recesses divided into upper and lower groups and said pins arranged in spaced apart groups including an upper group and a lower group with any selection of said stop pins comprising a pair including a pin from each of said upper and lower groups.

3. In printing apparatus, as defined by claim 2 wherein each of said groups of stop members contain at least one of said stop members consisting of two axial sections of different diameter pins.

4. In printing apparatus, as defined by claim 2 including a pin affixed to said supporting means between said upper and lower groups of pins and supporting said floatably mounted plate on said supporting means solely on movement of said plate to said one position.

5. In printing apparatus, as defined by claim 4 wherein said plate in said one position is free of said stop members.

References Cited

UNITED STATES PATENTS

| | | | |
|---|---|---|---|
| 3,157,265 | 11/1964 | Palmer | 197—16 |
| 3,227,259 | 1/1966 | Howard | 197—49 |
| 3,228,510 | 1/1966 | Howard | 197—49 |
| 3,256,969 | 6/1966 | Bretti | 197—16 X |
| 3,295,652 | 1/1967 | Sasaki | 197—53 |
| 3,302,765 | 2/1967 | Hickerson et al. | 197—18 X |
| 3,334,720 | 8/1967 | Hickerson | 197—16 X |
| 3,352,398 | 11/1967 | Crutcher et al. | 197—16 |

EDGAR S. BURR, Primary Examiner

U.S. Cl. X.R.

178—34; 197—18, 55